Patented Dec. 25, 1934

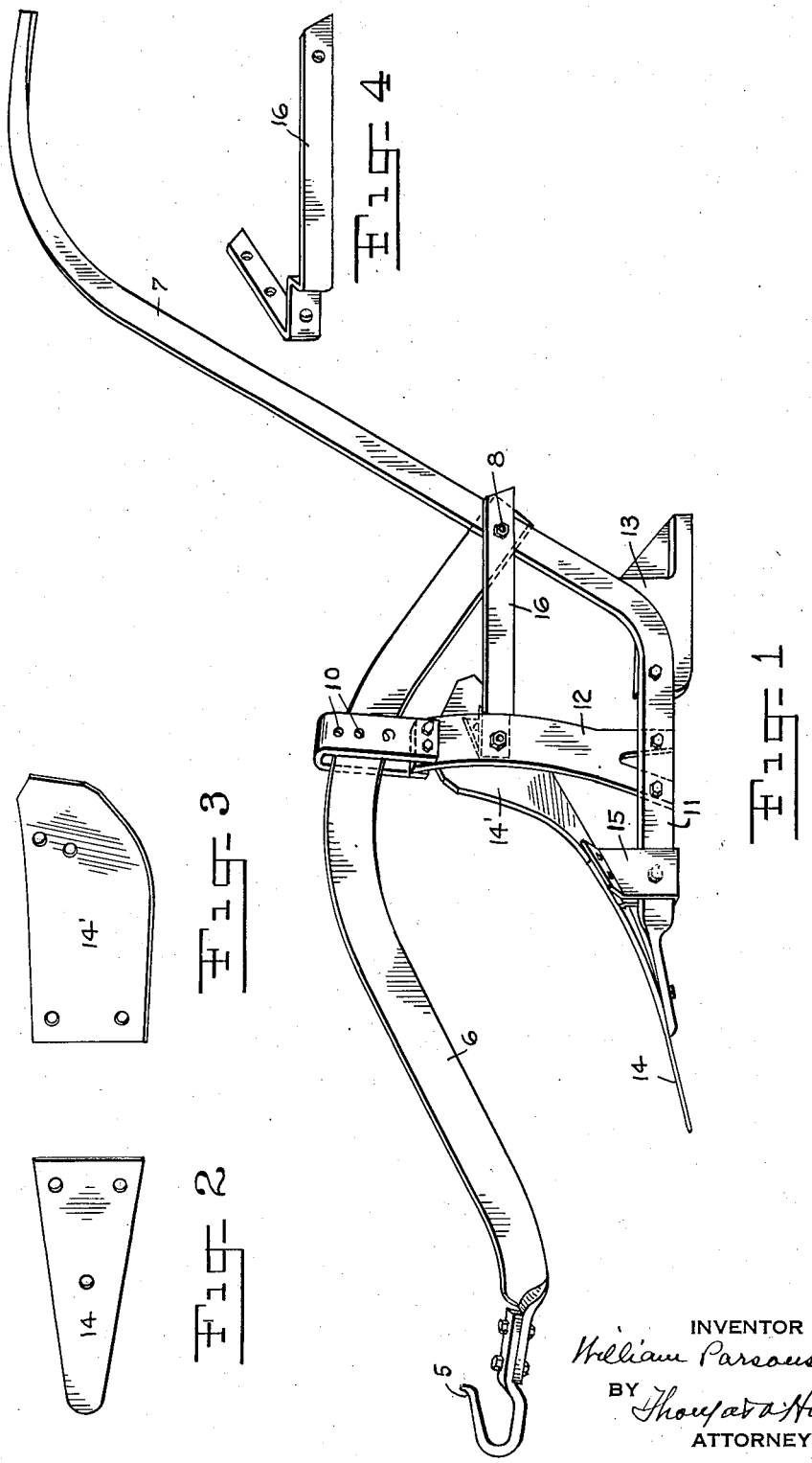

1,985,618

UNITED STATES PATENT OFFICE 1,985,618

PLOW

William Parsons, Manila, Philippine Islands

Application September 5, 1933, Serial No. 688,175

1 Claim. (Cl. 97—109)

My invention relates to improvements in plows, and more particularly has reference to a plow having a horizontal drive, combined with a vertical oscillating action, of strong, light and economic construction, and easily manipulated. The plow is especially suitable for cultivating rice, corn, sugar-cane, and other lands in tropical, semi-tropical and temperate climates, and is adaptable for being drawn by water-buffalo, bullock or horse.

In the accompanying drawing, I have illustrated a suitable form of plow embodying an application of my invention. Referring thereto, Fig. 1 illustrates in side elevation, a plow showing the features of my invention, Figs. 2, 3, and 4 are details in perspective illustrating parts thereof hereinafter referred to.

A direct horizontal drive is provided from the hitching hook 5, at the extreme front of the beam 6, to the rear end of the same, which is fastened to the handle-bar 7 preferably by a loose bolt as indicated at 8. This beam 6, it will be observed, is not secured at any other point, and therefore provides a direct drive at a suitable low level, same being most efficient.

The beam 6 passes through a suitable guide 9, which serves to hold the beam at the proper height at this curve, but allows the beam to oscillate freely in vertical direction within its boundaries. The beam may be regulated for plowing any desired depth simply by controlling its elevation within the guide 9, which it will be observed, is provided with bolt holes such as 10, through which a bolt may be passed over the top of the beam 6, thereby limiting the elevation of the beam within the guide, and controlling the depth of the furrow to be made. For instance, if the guide is left clear with no bolt therethrough as indicated, the beam is free to rise to the top of the guide 9, and will cut a furrow say nine inches deep. If the bolt is passed through the top hole of the guide 9, over the top of the beam 6, the beam is held in lower position, and the furrow will be made say seven inches deep, but if the bolt is passed through the lower hole in the guide 9, the beam being held still lower, will cut a furrow say about five inches deep. Thus the plow is readily adjustable for cutting furrows of predetermined depths, and for use under different conditions of soil.

The handle of the plow extends beneath the same, providing a base support as indicated at 11, for the standard 12, upon which the guide 9 is secured as shown, and also provides support for the shoe 13, and shear 14, secured by the brackets 15, the standard 12 being secured to the handle 7 by the bracket 16, which also serves to secure the upper part of the shear 14, or mold-board 14', thus providing a simple and cheaply constructed, strong, and readily adaptable form of plow.

Of course it will be understood that various modifications may be made in the construction and arrangement of parts without departing from the spirit of the invention as claimed.

I claim:

In a plow of the class described, a handle-bar extending beneath the plow, a shoe at the base of the handle-bar and a share at the front thereof, a standard connected to said handle-bar between said shoe and share, a mold-board secured to said standard, a plow-beam pivoted to said handle having means at the front for pulling the same, and adjustable connecting means between the beam and standard, said means including a U-shaped guide bracket fixed to the top of the standard having a vertical series of holes therein, and a pin selectively insertable through one of said holes and below, through or above said beam to fix its position relatively to the plowing elements.

WILLIAM PARSONS.